Patented Sept. 14, 1954

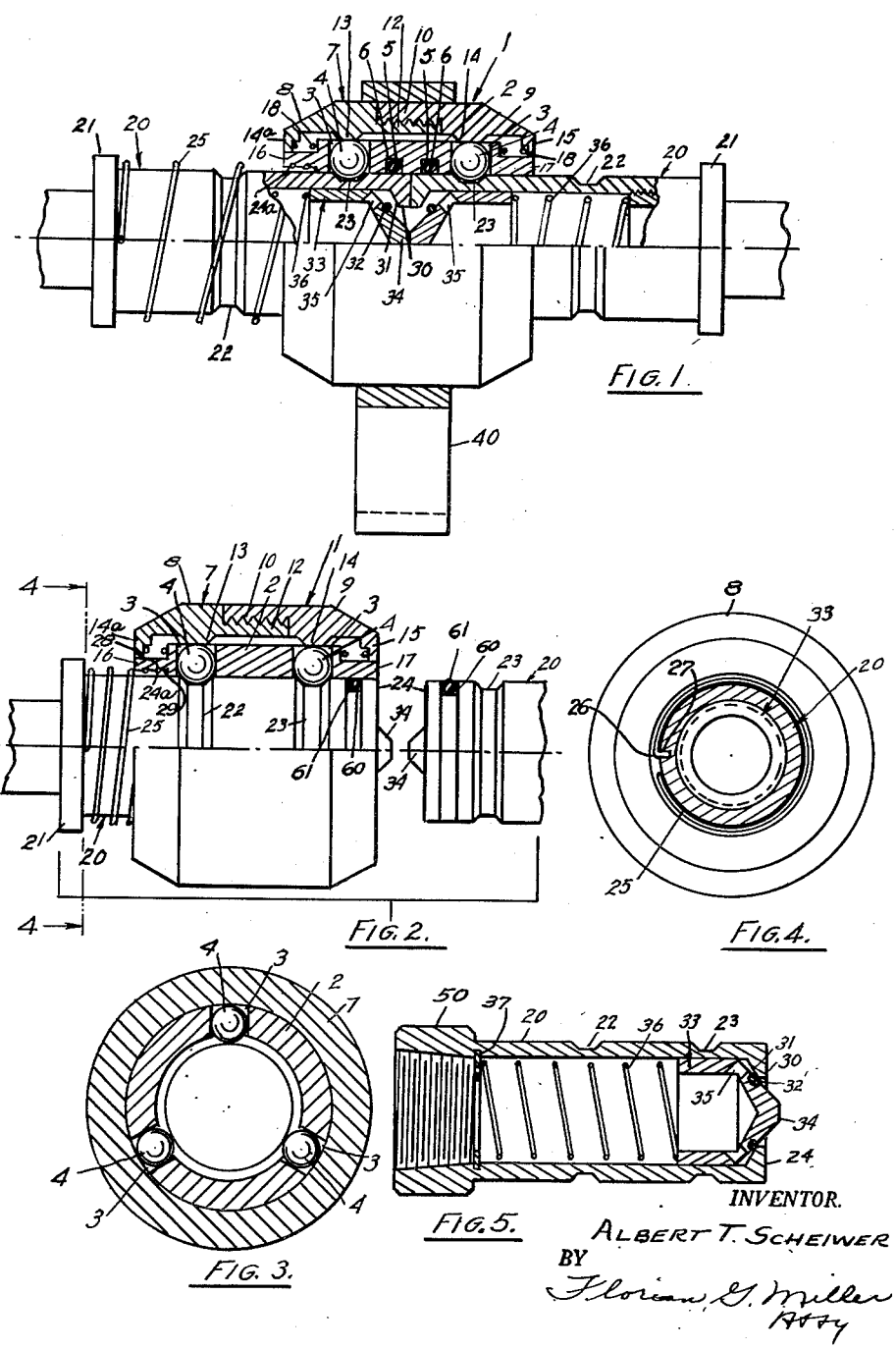

2,689,143

UNITED STATES PATENT OFFICE 2,689,143

COUPLING

Albert T. Scheiwer, Erie, Pa.

Application February 3, 1949, Serial No. 74,450

1 Claim. (Cl. 285—193)

This invention relates generally to couplings and more particularly to quickly attachable and detachable couplings which break upon any abnormal longitudinal movement thereof.

No suitable coupling has heretofore been provided for connecting hose lines between a prime mover and a trailer or any other drawn implement. Prior couplings have no means for breaking when there is an abnormal relative movement between a prime mover and a trailing vehicle with the result that the connecting hose lines are broken. Furthermore, the couplings when disconnected are filled with mud and dirt with the result that considerable cleaning is necessary and dirt gets into the fluid lines.

It is, accordingly, an object of my invention to provide a coupling having a single female member and two male members which is simple in construction, economical in cost, economical in manufacture, and efficient in operation.

Another object of my invention is to provide a coupling having a female member and two connecting male members, each of the male members having double grooves wherein the female coupling member may be completely closed upon disconnection of one of the male coupling members.

Another object of my invention is to provide a coupling for connecting two hose lines which breaks automatically upon abnormal longitudinal movement of the coupling members in either direction.

Another object of my invention is to provide a coupling having a female member for receiving two male members on opposite sides thereof which permits either male member to extend the complete length of the female member to close the female member to dust, dirt and the like when one of the male coupling members is disconnected.

Other objects of my invention will become evident from the following detailed description, taken in conjunction with the accompanying drawings, in which Fig. 1 is a side elevational view with parts thereof broken away on the center line of my novel coupling in an engaged position;

Fig. 2 is a side elevational view with parts thereof broken away on the center line of my novel coupling with one of the male members extending the entire length of the female member to close the female member when the coupling is in a disconnected position, the coupling shown in Fig. 2 differing from Fig. 1 in that washers are carried by the female member in Fig. 1 and by the male members in Fig. 2;

Fig. 3 is a vertical sectional view taken through the camming members of my novel coupling;

Fig. 4 is a view taken on the line 4—4 of Fig. 2; and

Fig. 5 is a vertical sectional view of one of the male members of my novel coupling with an internally threaded portion on one end thereof.

Referring now to the drawings, I show in Figs. 1 to 5 inclusive a female member 1 comprising an inner cylindrical shell 2 having ball retaining apertures 3 spaced longitudinally from each other for carrying camming members or balls 4, and inner peripheral grooves 5 spaced from each other for receiving annular washers 6. An outer locking sleeve 7 moves telescopically on the shell 2 and it comprises mated annular members 8 and 9 having internal and external threaded portions 10 and 12 respectively for threadable engagement with each other. The annular members 8 and 9 have inner annular cam portions 13 and 14 spaced from each other a distance equal to the distance between the ball retaining apertures 3 in the shell 2. The members 8 and 9 have inwardly directed skirted portions 14a and 15 on the outer ends thereof which ride on or over-ride the outwardly extending, flanged end portions 16 and 17 on the shell 2. Spring members 18 urge the cam portions 13 and 14 on the members 8 and 9 to a locking position as shown in Figs. 1 and 2.

Each of the male members 20 have upwardly directed flanged portions 21 and spaced, peripheral grooves 22 and 23 for locking engagement with the balls 4 carried by the shell 2. The grooves 22 and 23 are spaced from each other a distance equal to the distance between the ball retaining apertures 3 in the shell 2. The distance between the outer groove 23 and the end 24 of the male member 20 is equal to the distance from either of the retaining apertures 3 in the shell 2 to the skirted outer sides 14 and 15 of the members 8 and 9.

Each of the male members 20 have an inwardly directed end flange 30 with a tapered inner portion 31 for engaging an annular washer 32 on a cylindrical shaped check valve 33 telescopically disposed in each of the male members 20. The check valve 33 has an outwardly projecting nose portion 34 which projects outwardly from the face of the flanged portion 30 so that when the check valves 33 in each of the male coupling members 20 engage as shown in Figs. 1 and 2, they will be forced rearwardly and the washers 32 will be forced away from the seats 31 permitting the free flow of fluid through the apertures 35 in the check valves 33. Springs 36 urge the check valves 33 to a sealed position and a spring clip 37 provides an abutment for the end of the springs 36.

The male members 20 in Fig. 2 each have a peripheral groove 60 for receiving a washer 61 thereby requiring no washer on the female member 1.

A coil compression spring 25 is telescopically disposed on one of the male members 20 as shown in Fig. 1, one end 26 thereof being anchored in an aperture 27 and the opposite end 28 thereof engaging grooves 29 on the inner side of the end flange 16, the end flange 16 being spaced from the outer periphery of the male member 20. When the sleeve 7 is slidably moved on shell 2, balls 4 and 14 move out of grooves 23 and spring 25 urges the female member, including shell 2 and the balls 4 and sleeve 7 of the female member, toward the other male member.

A suitable bracket 40 is provided to secure the locking sleeve 9 of the female member 1 in a stationary position as shown in Fig. 1.

In operation, my novel coupling, when in a disengaged position, is as shown in Fig. 2 with the male member 20 on a prime mover disposed completely in the female member 1 with the grooves 22 and 23 being engaged by the ball members 4 which in turn are urged to a locking position by the camming portions 13 and 14 of the locking sleeve 7. Springs 18 are disposed between and engage the inwardly directed skirted portions 14a and 15 and the flanged portion 60 maintaining the camming portions 13 and 14 in locking engagement with the ball members 3. It will be seen that the female member 1 will be completely closed thereby preventing any dirt or other extraneous matter from entering into any of the working parts thereof or into the line to which it is connected. When it is desired to connect another hose line such as the hose line on a trailing vehicle or on an implement, the operator grasps the disengaged member 20 manually and brings the nose portion 34 of the disengaged male member 20 in Fig. 2 into engagement with the nose portion 34 of the engaged member 20 and applies a force thereto. Since the sleeve 7 is held in fixed position by bracket 40, the balls 4 held by the grooves 22 and 23 will be engaged by the shell and move the shell 2 with the engaged male member until the cam surfaces 13 and 14 move out of engagement with balls 4, allowing balls 4 to move out of grooves 22 and 23. As force on the male members continues, the engaged male member 20 which is no longer held by balls 4 will slide in shell 2, allowing disengaged member 20 to enter the shell. The disengaged male member 20 will continue to force the engaged member 20 slidably in the shell against the force of spring 25 until one row of balls is aligned with the grooves 23 in both male members. When one row of balls 4 line up with each groove 22 and 23, balls 4 will be forced into grooves 22 and 23 by the reaction of shell 2 forced slidably in sleeve 7 and balls 4 will be forced into grooves 22 and 23. One end of the shell will then be flush with the end of the check valve and male member.

To disassemble the male member shown in Fig. 1, the operator will grasp the male member shown at the right in the drawing and pull. Since sleeve 7 is held in fixed position by bracket 40, the balls, shell 2, and male member will move relative to sleeve 7 until camming portions 13 move off balls 4. Then balls 4 will move out of grooves 23 and tension spring which is fixed to male member 20 at 27 and to shell 2 by its engagement with grooves 29 will cause male member 20 to move through shell 2 until the assembly assumes the position shown in Fig. 2. It is, therefore, apparent that my novel coupling can be engaged by the operator grasping one male member only and disengaged by the operator pulling on one male member only. When bracket 40 is attached to one vehicle, for instance, a prime mover, and one male member 20 is attached to the hydraulic system of the same vehicle and the other male member 20 attached to a vehicle to be towed, when the operator uncouples the hitch between the two vehicles and fails to disconnect the hydraulic lines, the force exerted on one male member by the uncoupled vehicle will disconnect the hydraulic lines, the force exerted on one male member by the uncoupled vehicle will disconnect the hydraulic coupling as explained above in connection with the manual disconnection thereof and the spring 25 will retract the shell into flush relation with the end of the other male member. Upon connecting the two male members 20, check valves 33 are moved longitudinally and are unseated when the nose portions 34 thereof engage as shown in Fig. 1 thereby permitting the free flow of fluid through the connected male members 20. Upon engaging the male members 20 with the female member 1, the engaged and disengaged male members 20 are usually abutted against each other and move to a locked position in unison.

In Fig. 5, I have shown a male member 20 with a threaded end 50 for connection to a threaded hose coupling.

It will be evident from the foregoing description that I have provided a novel fool-proof coupling which provides for engagement of two male members with a female member, which will disengage automatically upon an abnormal longitudinal pull on one of the male members, which is very simple in construction, and which permits one or the other of the coupling members to extend the complete length of the female member to close it against admission of dirt and the like.

Various changes may be made in the specific embodiment of my invention without departing from the spirit thereof or from the scope of the appended claim.

I claim:

A coupling comprising a female member having a shell, spaced cam members carried by said shell, a locking sleeve having spaced cam portions telescopically disposed on said shell, said spaced cam portions engaging said cam members, said shell and said sleeve being movable relative to each other moving said cam portions out of engagement with said cam members, a first male member telescopically received by said shell and having spaced peripheral grooves adapted to be engaged by said cam members, the spacing of said grooves being equal to the spacing of said cam members, the end of said shell being substantially flush with the end of said male member when both the male member grooves are engaged by said cam members, a second male member having a peripheral groove, said female member being telescopically movable on said first male member telescopically receiving said second male member whereby one said spaced cam member engages a groove on said first male member and another spaced cam member engages the said groove on said second male member, and a spring attached to one said male member and to said shell urging said shell toward a position where said spaced cam members engage both said spaced grooves and said shell is flush with one end of one said male member.

References Cited in the file of this patent

UNITED STATES PATENTS

| Number | Name | Date |
|---|---|---|
| 130,095 | Wightman | July 30, 1872 |
| 1,494,291 | Sanford | May 13, 1924 |
| 2,255,333 | Scheiwer | Sept. 9, 1941 |
| 2,386,270 | Samiran | Oct. 9, 1945 |
| 2,479,960 | Osborn | Aug. 23, 1949 |
| 2,512,999 | Bruning | June 27, 1950 |
| 2,643,140 | Scheiwer | June 23, 1953 |